April 2, 1957 S. STEVENS ET AL 2,787,360
TRANSFER CAR ASSEMBLY
Filed Oct. 10, 1955 3 Sheets-Sheet 1
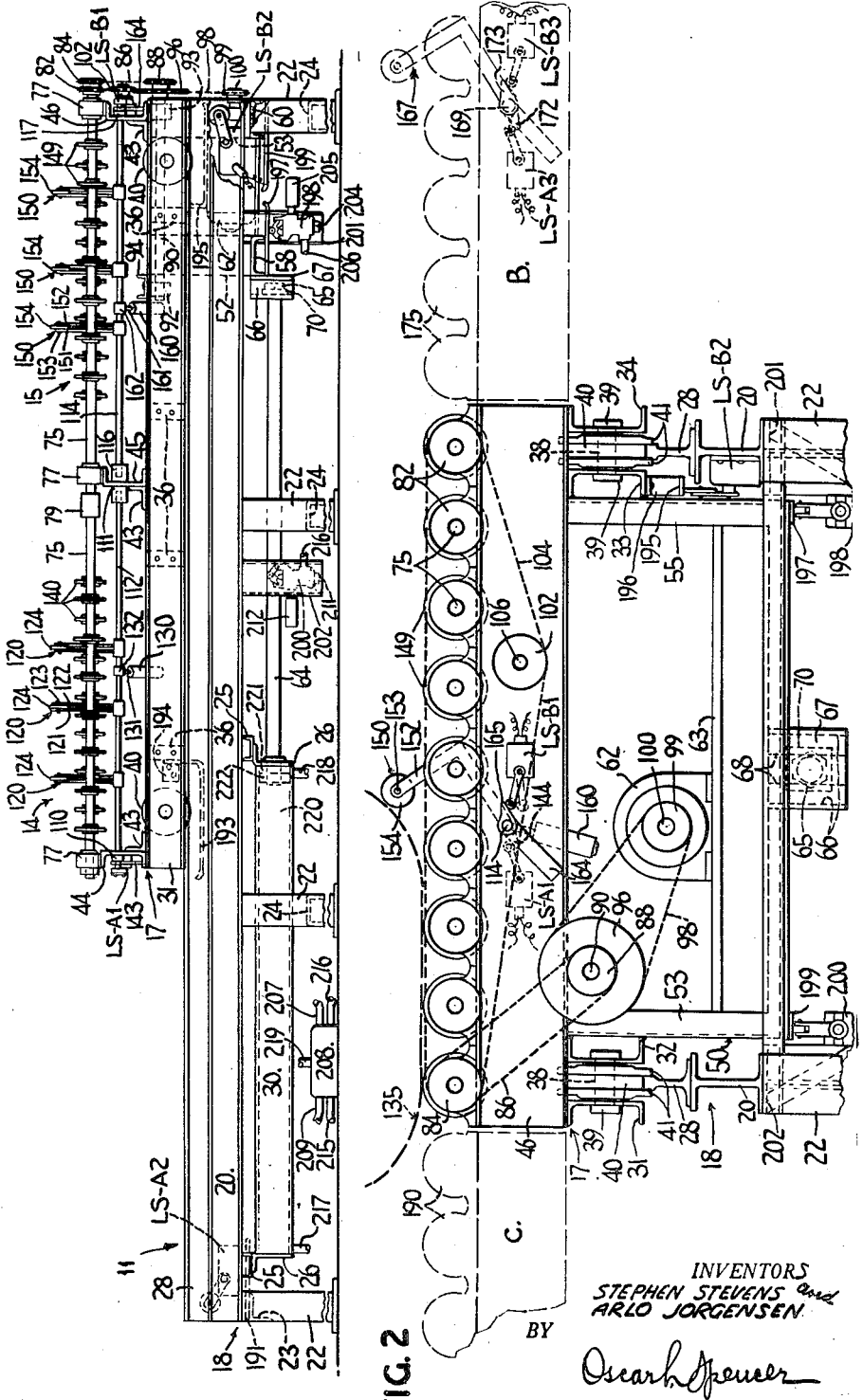
INVENTORS
STEPHEN STEVENS and
ARLO JORGENSEN
BY
Oscar L. Spencer
ATTORNEY

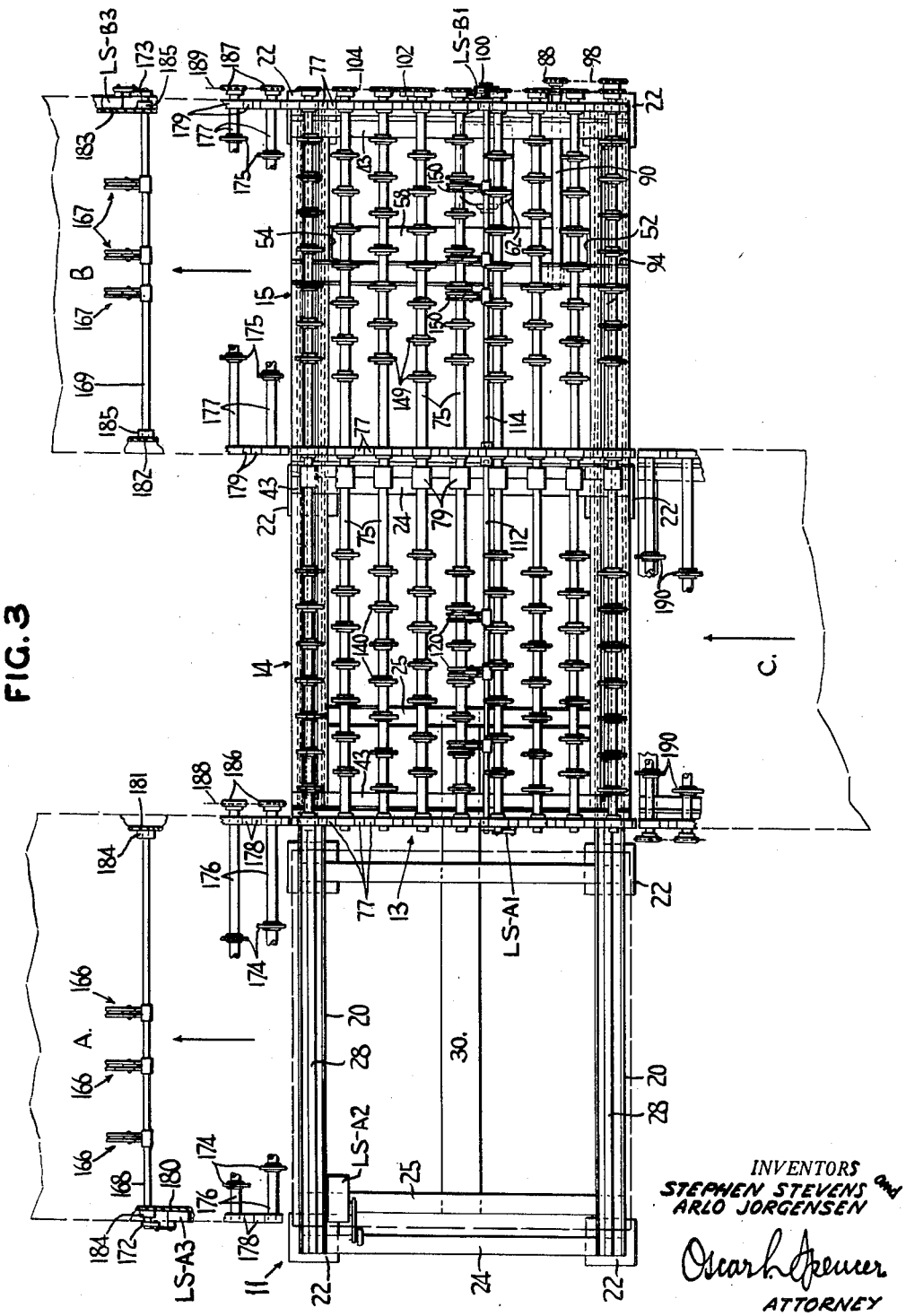

April 2, 1957

S. STEVENS ET AL 2,787,360

TRANSFER CAR ASSEMBLY

Filed Oct. 10, 1955

INVENTORS
STEPHEN STEVENS and
ARLO JORGENSEN
BY
Oscar H. Spencer
ATTORNEY

United States Patent Office 2,787,360
Patented Apr. 2, 1957

2,787,360

TRANSFER CAR ASSEMBLY

Stephen Stevens, Crystal City, Mo., and Arlo Jorgensen, Ingram, Pa., assignors to Pittsburgh Plate Glass Company Application October 10, 1955, Serial No. 539,432

10 Claims. (Cl. 198—31)

This invention relates to a transfer car assembly, and more especially relates to a shuttle conveyor assembly for transferring articles, such as glass sheets, from one conveyor automatically and alternately to two other conveyors. The invention preferably relates to an assembly that automatically and alternately transfers to the two conveyors but with slight change of switches is utilized for repetitive transfer from the first conveyor to either of the receiving conveyors.

In the lamination of safety glass, including curved windshields, the safety glass is manufactured by placing a sheet of a thermoplastic material between two sheets of glass to form a composite assembly. The assembly is passed by a conveyor through a lehr and the heated assembly is then passed between a pair of rolls whereby the air between the glass sheets and the thermoplastic interlayer is removed and the marginal area at least of the composite assembly has the thermoplastic interlayer bonded to the two glass sheets. This operation of passing the composite assembly through a lehr and then through a pair of rolls, such as inflated nipper rolls, is called preliminary pressing. Before placing the prepressed composite assembly into an oil for final pressing at an elevated temperature and pressure, it is usually subjected to edge rolling. For this purpose a tool having a roller that is about the thickness of the thermoplastic interlayer is utilized. The roller of the tool is rolled between the two sheets of glass at the periphery to force the thermoplastic inwardly thereby improving the seal or bond of the thermoplastic material to the glass sheets in the marginal area of the composite assembly.

In the oil the composite assembly is subjected to an elevated temperature and pressure to complete the bonding or uniting of the thermoplastic interlayer to both of the glass sheets throughout the area of the composite assembly. In the initial immersion of the composite assembly in the oil, the latter can be at a temperature as high as 150° F. With the composite assembly immersed in the oil, the latter is subjected to an elevated pressure, such as 200 pounds per square inch. After the pressure is obtained the oil is heated to an elevated temperature, such as 250° F., and maintained at the elevated temperature while maintaining the elevated pressure. The period of treatment at the elevated temperature and pressure depends on these values. For example, at 250° F. and 200 pounds per square inch the treatment is continued for about 45 minutes. At the end of this time the oil temperature is lowered to 150° F., and then the pressure is released. The bonded or laminated assembly is then removed from the oil, washed to remove oil from the surfaces and dried.

In the preparation of the composite assembly of two sheets of glass and thermoplastic interlayer for prepressing, the operation is carried out preferably in an air-conditioned room in order to control the temperature and moisture content of the thermoplastic interlayer sheets that are placed between the two glass sheets. On a moving conveyor entering the room is a pair of matched curved glass sheets. A sheet of interlayer is placed on the moving bottom glass sheet and the top glass sheet is then positioned on the interlayer and the conveyor moves the composite assembly out of the air-conditioned room. The rate at which the composite assembly can be assembled on the moving conveyor is considerably greater than the rate at which the composite assembly is passed through the lehr and the prepressing machine. As a result, one assembly line can provide sufficient composite assemblies to feed two conveyors that pass the composite assemblies through two lines of lehr and prepressing machine. Thus it is desirable to operate a single assembly conveyor line for two conveyor lines for the prepressing operation.

It is an object of the present invention to provide a machine that can receive articles from a feeding conveyor and transfer them selectively and automatically to one of two receiving conveyors.

It is a further object of the present invention to provide an automatic machine for the transfer of composite assemblies of glass sheets and thermoplastic interlayer from an assembly conveyor to two conveyor lines for prepressing either alternately to the prepressing conveyor lines or selectively and repetitively to either one of the two prepressing conveyor lines.

It is still a further object of this invention to provide a conveyor assembly that includes a feeding conveyor and two receiving conveyors, all of which have a path of movement that is parallel to but non-coincident with the path of movement of the other conveyors, and further including a transfer car assembly that has a conveyor for receiving articles from the receiving conveyor and selectively transfers them to one or the other of the two receiving conveyors.

Other objects of the present invention will be apparent to one skilled in the art from the description of the preferred embodiment which follows when taken in conjunction with the drawings in which similar parts are designated by the same numerals and in which:

Fig. 1 is a front elevation of the transfer car assembly of this invention with the supporting structure partially broken away in order to show one of the limit switches actuated by movement of the conveyor carriage on the supporting structure;

Fig. 2 is an end elevation of the transfer car assembly and showing in dotted lines part of the feeding conveyor and one of the two receiving conveyors and the limit switches actuated by cams moved by arms on both receiving conveyors;

Fig. 3 is a top plan view of the transfer car assembly and showing more clearly the relationship of the feeding conveyor and the two receiving conveyors;

Figure 4:
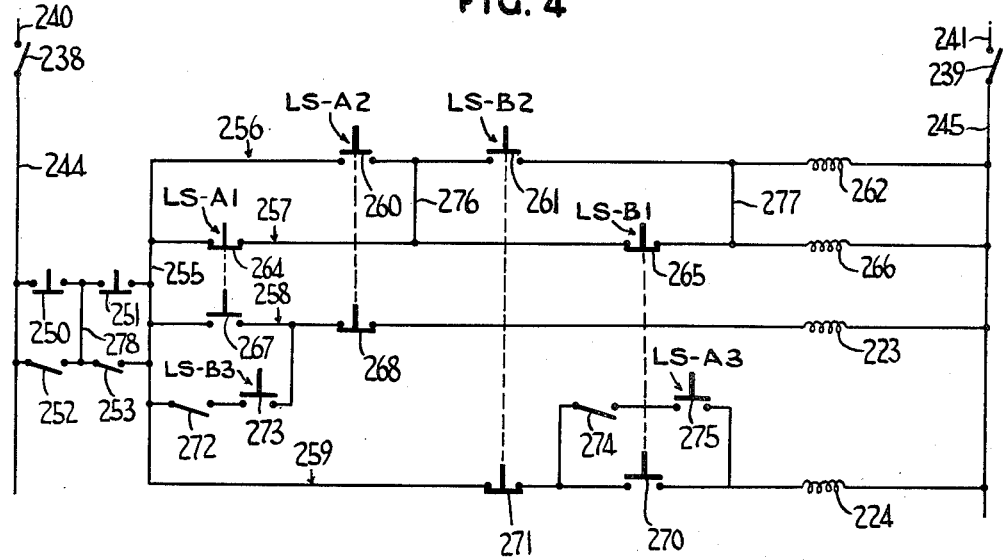
Fig. 4 is a schematic drawing of the electrical control system by which the articles can be transferred from the feeding conveyor by means of the transfer car assembly to the two receiving conveyors alternately or to one or the other of the receiving conveyors repetitively.

The preferred embodiment of this invention is described below in connection with the transfer of curved composite assemblies of two matched curved sheets of glass and a thermoplastic interlayer to one of two conveyor lines for a prepressing operation. Various details will be given by of example and not for the purpose of limitation.

As seen in Fig. 3, a transfer car assembly generally indicated at 11 is placed at the receiving end of two conveyors A and B for two lines of prepressing. The opposite side of the transfer car assembly 11 is adjacent the discharge end of conveyor C of the assembly operation, i. e., the conveyor on which the composite assembly is prepared. In this preferred embodiment, transfer car assembly 11 is provided with a conveyor generally indicated at 13 that is sufficiently wide so that one conveyor portion generally indicated at 14 is in alignment with conveyor A when another conveyor portion generally indicated at 15 is in alignment with conveyor C at one limit of the movement of a carriage generally indicated at 17 of transfer car assembly 11. At the other limit of movement of carriage 17 conveyor 13 has the first portion 14 in alignment with conveyor C and the second portion in alignment with conveyor B as shown in Fig. 3.

Transfer car assembly 11 is provided with the carriage 17 movably mounted on a supporting frame generally indicated at 18. The frame 18 has a pair of spaced apart horizontal I-beams 20 rigidly mounted on two rows of vertical supports 22. The frame 18 also includes a horizontal transverse angle iron 23 at one end and welded to the end vertical supports 22. Horizontal transverse channel members 24 are welded to beams 20. A pair of horizontal transverse channel members 25 are welded at their ends to the undersurfaces of I-beams 20. To the channel members 25 are mounted flanged ends 26 of an air cylinder 30. Rails 28 are mounted on I-beams 20.

The carriage 17 includes horizontal channel members 31, 32, 33 and 34. The channel members 31 and 32 are arranged in back-to-back relationship and are spaced apart by means of spacers 36 mounted therebetween. The channel members 33 and 34 are similarly mounted. Between channel members 31 and 32 and between channel members 33 and 34 are axles 38 mounted in bearing plates 39 on members 31, 32, 33 and 34. On axles 38 are mounted wheels 40 having peripheral flanges 41. Wheels 40 engage rails 28.

The carriage 17 also includes angle irons 43 and channel members 44, 45 and 46 mounted transversely on the channel members 31, 32, 33 and 34. The carriage 17 has a hanger assembly generally indicated at 50 that includes four downwardly extending channel members 52, 53, 54 and 55 welded to channel members 32 and 33. Welded to the bottom ends of channel members 52 and 54 is a transverse horizontal channel member 58. Welded to the bottom ends of channel members 53 and 55 is a transverse horizontal channel member 60. A motor 62 is mounted on plate 63 mounted in the hanger assembly 50.

Piston rod 64 of air cylinder 30 is threaded at its free end and has mounted thereon a nut 65. A pair of spaced apart angle iron members 66 are welded at the ends of one flange of each to plate 67 that is welded to channel member 58. The free end of flange 68 of each member 66 extends toward the free end of other flange 68 to provide a slot in the wall formed by these free flanges thereof. The end of rod 64 extends through the slot. A washer 70 is on rod 64 between the slot and the nut 65 on the threaded end of rod 64 and is wider than the slot. The combined thickness of washer 70 and nut 65 is less than the distance from the inner surfaces of free flanges 68 of members 66 to plate 67. By means of this structure rod 64 can move carriage 17 in either direction but rod 64 has some freedom of movement transversely at its end to its path of movement in cylinder 30 and thereby prevents scoring of the air cylinder 30.

Shafts 75 are mounted in pillow blocks 77 on channel members 44, 45 and 46. Shafts 75 of portion 14 of conveyor 13 are connected to the shafts 75 of portion 15 of conveyor 13 by means of keyed sleeve couplings 79. Mounted on one end of each of shafts 75 of portion 15 of conveyor 13 are sprockets 82. Also mounted on one of shafts 75 of portion 15 of conveyor 13 is a sprocket 84 connected by chain 86 to sprocket 88 on shaft 90 supported by brackets 92 and 93. Bracket 92 is mounted to the undersurface of transverse channel member 94 mounted on channel members 31, 32, 33 and 34. Supporting bracket 93 is mounted to the undersurface of channel member 46. Sprocket 96 is also mounted on shaft 90 and is joined by chain 98 to sprocket 99 on shaft 100 of motor 62. Engaging sprockets 82 and idler sprocket 102 is chain 104. Idler sprocket 102 is mounted by shaft 106 supported by channel member 46.

Rotatively mounted in bearings 110 and 111 is shaft 112. Bearings 110 and 111 are mounted to channel members 44 and 45, respectively. Shaft 112 extends through channel member 44. Similarly, shaft 114 is rotatively mounted in bearings 116 and 117 supported by channel members 45 and 46, respectively, and extends through channel members 46.

Mounted on shaft 112 are actuating arms indicated generally at 120 by set screws (not shown). Actuating arms 120 include a pair of spaced arms 121 and 122. Between the free end of each pair of spaced arms 121 and 122 of each actuating arm 120 by means of a pin 123 is mounted a rubber wheel 124. Actuating arms 120 are biased into the position shown in Figs. 1 and 2 by means of a counterweight 130 on an arm 131 of a support bracket 132 mounted by a set screw (not shown) on shaft 112. As seen from Fig. 2 rubber wheels 124 of actuating arms 120 are in the path of travel of curved composite assembly of a pair of matched sheets and thermoplastic interlayer schematically illustrated at 135 being transferred from conveyor C. Shafts 75 have mounted thereon doughnut rubber wheels 140 which convey composite assembly 135 across transfer car assembly 11 in a direction transverse to rails 28. Moving composite assembly 135 rotates actuating arms 120 about shaft 112. Rotation of shaft 112 by counterweight 130 so that wheels 124 of actuating arms 120 will be in a position for engaging the composite assembly 135 is limited by engagement of a stop member 143 against channel member 43. The stop member 143 is mounted on shaft 112 by a set screw (not shown). A cam 144 is mounted by a set screw (not shown) on the end of shaft 112. The cam 144 upon rotation of shaft 112 in a clockwise direction as viewed in Fig. 2 engages a limit switch LS–A1.

The portion 15 of conveyor 13 is also provided with doughnut rubber wheels 149 mounted on shafts 75. Actuating arms 150, each having a pair of spaced arms supporting a pin 153 on which are mounted rubber wheels 154, are mounted on shaft 114 in the same manner as actuating arm 120 is mounted on shaft 112. The arms 150 are biased means of a counterweight 160 in a position to be engaged by a composite assembly 135. The counterweight 160 is mounted on an arm 161 of a support bracket 162 mounted on shaft 114 by a set screw (not shown). Rotation of shaft 114 by counterweight 160 is limited by a stop member 164. A cam 165 is mounted by a set screw (not shown) on the end of shaft 114 and upon rotation of shaft 114 in a clock-wise direction as viewed in Fig. 2 engages a limit switch LS–B1.

As seen in Figs. 2 and 3, conveyors A and B are similarly provided with actuating arms generally indicated at 166 and 167, respectively, mounted on shafts 168 and 169, respectively. Cam 172 mounted on shaft 168 upon rotation of shaft 168 engages a limit switch LS–A3. Similarly, cam 173 on shaft 170 upon rotation of shaft 170 engages a limit switch LS–B3. Shafts 168 and 169 are provided with counterweights and stop members (both not shown). Conveyors A and B are provided with doughnut rubber wheels 174 and 175 on shafts 176 and 177, respectively, mounted on pillow blocks 178 and 179, respectively, mounted on side rails 180, 181, 182 and 183. Limit switches LS–A3 and LS–B3 are mounted on side rails 180 and 183. Shafts 168 and 169 are mounted on rails 180, 181, 182 and 183 by means of bearings 184 and 185. Shafts of conveyors A and B are driven by sprockets 186 and 187 and chains 188 and 189. Conveyor C is provided with doughnut rubber wheels 190 mounted and driven in the same manner as wheels 174 and 175 of conveyors A and B.

A limit switch LS–A2 is mounted at the left end, as viewed in Fig. 1, of transfer car assembly 11. Limit switch LS–A2 is mounted on plate 191 mounted on angle iron 23. At the other end of supporting frame 18 is a limit switch LS–B2 mounted on beam 20. A cam 193 is mounted on carriage 17 by means of bracket 194 bolted to channel member 33 and engages limit switch LS–A2 when carriage 17 has travelled to the left side, as viewed in Fig. 1, of supporting frame 18. The cam 193 is shaped to engage limit switch LS–A2 slightly before the carriage 17 has reached the left-hand limit of its movement and continues to engage limit switch LS–A2 at the extreme left-hand movement of carriage 17. Similarly a cam 195 is mounted by a bracket 196 to channel member 33 at the right-hand end section of carriage 17. The cam 195 engages limit switch LS–B2 just before carriage 17 has reached the extreme right-hand limit, as viewed in Fig. 1, of its movement and maintains engagement with limit switch LS–B2 at the extreme right position of carriage 17 on frame 18 as seen in Fig. 1. Cams 193 and 195 and their brackets 194 and 196, respectively, are mounted on the same side of carriage 17 in this preferred embodiment.

A cam 197 is mounted to the undersurface of channel member 58 on the right-hand end, as viewed in Fig. 2. The cam 197 is shaped and positioned to engage a three-way, cam-operated valve 198 shortly before carriage 17 reaches the extreme right-hand position, as viewed in Fig. 1, of its movement and cam 197 continues to engage valve 198 throughout the continued right-hand movement including the ultimate right-hand position of movement of carriage 17. Similarly, a cam 199 is mounted on the under side of channel member 60 but at the left-hand side, as viewed in Fig. 2, and engages a three-way, cam-operated valve 200 shortly before carriage 17 has reached the extreme left-hand position, as viewed in Fig. 1, of its movement and such engagement continues through the extreme left-hand position of carriage 17 on frame 18. Valves 198 and 200 are mounted on supporting brackets 201 and 202, respectively, that are mounted to beams 20.

Valve 198 is a rocker, controlled-exhaust, three-way, cam-operated valve having a free exhaust line 204, a controlled exhaust line 205 and an inlet line 206. Line 206 is connected to an outlet line 207 of four-way solenoid-operated valve 208. The valve 208 is provided with another outlet or exhaust line 209 connected to inlet line 210 of valve 200 having a free exhaust line 211 and a controlled exhaust line 212. Lines 215 and 216 of valve 208 are connected to lines 217 and 218, respectively, of air cylinder 30. Valve 208 is provided also with an air inlet line 219 connected to a source of compressed air (not shown). Lines 217 and 218 serve alternately as inlet and exhaust lines to provide compressed air or remove air from the two chambers 220 and 221 of air cylinder 30 separated by piston 222.

Valve 208 is shown schematically in Fig. 1 and includes two solenoids, 223 and 224, not shown in Fig. 1 but shown schematically in Fig. 4. Solenoid 223 actuates valve 208 by moving its piston (not shown) so that compressed air in line 219 flows through lines 216 and 218 into chamber 221 of cylinder 30 and air from chamber 220 is exhausted by lines 217 and 215 through three-way operated valve 208 and by lines 209 and 210 into valve 200. Air escapes valve 200 through free exhaust line 211 until valve 200 is actuated by cam 199. Then air is exhausted slowly through line 212 until the piston rod 64 of air cylinder reaches the left-hand limit (as viewed in Fig. 1) of its travel.

A solenoid 224 moves the piston (not shown) of four-way valve 208 in the direction opposite the movement obtained by current flowing through solenoid 223 to allow compressed air from inlet line 219 via lines 215 and 217 into chamber 220 and to exhaust air from chamber 221 by lines 218 and 216, through valve 208 into line 207. Air from line 207 is exhausted through line 206 into valve 198 and out free exhaust line 204 of valve 198. When carriage 17 has moved almost to the extreme right by means of piston 64, cam 197 engages valve 198 to exhaust air from chamber 221 by controlled exhaust line 205 instead of free exhaust line 204 thus slowing down the exhaust of air from chamber 221 before piston rod 64 reaches the maximum right-hand position of its movement as viewed in Fig. 1.

In Fig. 4 is shown schematically the control circuit for starting and stopping conveyor 13 and for reciprocating carriage 17 on frame 18 as well as part of the control for the operation of conveyor A. The control circuit is connected by switches 238 and 239 to lines 240 and 241 of a three-phase electrical power line for operating the motors of conveyors A, B and C as well as for operating motor 62 of conveyor 13. Lines 244 and 245 are connected to lines 240 and 241 by switches 238 and 239, respectively. Line 244 is connected through either contacts 250 and 251 or switches 252 and 253 to line 255 that is connected to line 245 by four circuits in parallel and indicated generally at 256, 257, 258 and 259. Circuit 256 includes in series a normally open contact 260 of limit switch LS–A2, a normally open contact 261 of limit switch LS–B2 and a coil 262 of a time-delay relay that closes a normally open contact 263 (Fig. 6) when coil 262 is energized and maintains it closed for six seconds after deenergization of coil 262. The contact 261 is between coil 262 and contact 260. Circuit 257 includes in series a normally closed contact 264 for limit switch LS–A1, a normally closed contact 265 for limit switch LS–B1 and coil 266 of a starter for motor 62. The contact 265 is between coil 266 and contact 264. Circuit 258 has in series a normally open contact 267 of limit switch LS–A1, a normally closed contact 268 of limit switch LS–A2 and solenoid coil 223 for four-way valve 208. The contact 268 is between contact 267 and coil 223. Circuit 259 is similar to circuit 258 except a normally open contact 270 of limit switch LS–B1 is in series with and between a normally closed contact 271 of limit switch LS–B2 and a solenoid coil 224 of valve 208. In parallel with contact 267 between line 255 and contact 268 is a switch 272 and a normally open contact 273 of limit switch LS–B3. Also in parallel with the normally open contact 270 between contact 271 and coil 224 in circuit 259 is a switch 274 and a normally open contact 275 of limit switch LS–A3. In addition, as seen in Fig. 4, circuits 256 and 257 are connected by line 276 between contact 260 and contact 261 of circuit 256 and between contacts 264 and 265 of circuit 257 and are connected by line 277 between the contact 261 and coil 262 of circuit 256 and between coil 266 and contact 265 of circuit 257. Line 278 connects contact 250 with switch 253 and connects contact 251 with switch 252.

Figure 5:
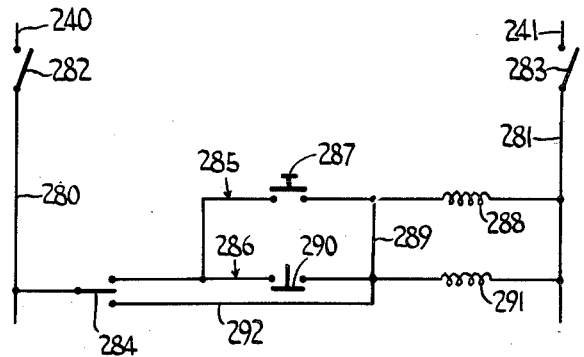
Fig. 5 is a schematic drawing of the electrical control which is used for each of the two receiving conveyors and which serves to provide a control on the control system of Fig. 4 in the repetitive operation.

Fig. 5 shows schematically the control system for the operation of conveyor A and a similar system is used for operation of control of conveyor B. Lines 280 and 281 are connected by switches 282 and 283, respectively, to lines 240 and 241 of the three-phase power source mentioned above. Line 280 and line 281 are connected through a switch 284 having an off-position, a manual position and an automatic position. The automatic position of switch 284 is connected in parallel to line 281 by circuits generally indicated at 285 and 286. In circuit 285 is push button switch 287 and coil 288 of a starter for a motor (not shown) that operates conveyor A. Coil 288 is between push button switch 287 and line 281. Circuit 286 includes a normally open contact 290 and a coil 291 of a relay (not shown) that closes contact 250 (Fig. 4). Contact 290 is closed by current flowing through coil 288 of the motor starter. The manual contact of switch 284 is connected by line 292 to circuit 286 between contact 290 and coil 291. Circuit 284 between switch 287 and coil 288 and circuit 285 between contact 290 and coil 291 are connected by line 289.

Figure 6:
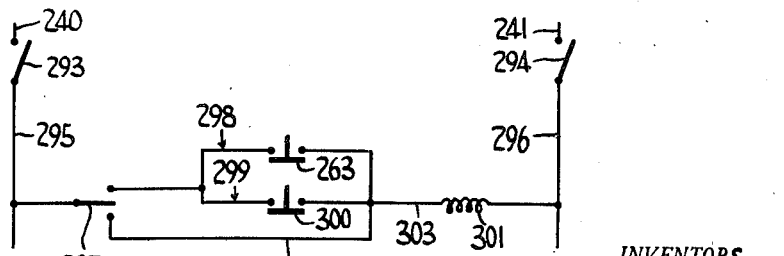
Fig. 6 is a schematic drawing of the electrical control for the feeding conveyor and shows the manner of control of the feeding conveyor by means of the control system shown in Fig. 4.

The control mechanism for the operation of a motor (not shown) to operate conveyor C is shown in Fig. 6. Lines 240 and 241 of a three-phase line from the electrical power source (not shown) is connected by switches 293 and 294, respectively, to lines 295 and 296, respectively. Lines 295 and 296 are connected through a switch 297 having an off position, a manual position, and an automatic position. The automatic position is connected in parallel by circuits generally indicated at 298 and 299. Circuit 298 includes the normally open contact 263 of time-delay relay having a coil 262 (Fig. 4) described above, and circuit 299 includes a normally open contact 300. Parallel circuits 298 and 299 are connected in series with coil 301 of a starter (not shown) for a motor (not shown) for operating conveyor C. The manual position of switch 297 is connected by line 302 to line 303 connecting coil 301 to circuits 298 and 299.

Operation

In the following description of the operation of the transfer car assembly 11, carriage 17 is in the position on frame 18 indicated in Figs. 1 and 3 at the start of the operation, although it will be seen from the description that the transfer operation can be initiated with the carriage 17 at the far left-hand side of frame 18. In the latter case the first composite assembly 135 would be transferred from conveyor C to conveyor B rather than transferred from conveyor C to conveyor A as indicated below.

Conveyor A is started by closing switches 282 and 283, moving switch 284 to the automatic position, and pressing on push button switch 287 to energize coil 288 of the starter for the motor that operates conveyor A. Energization of coil 288 closes contact 290 as well as the three contacts of the three-phase line to the motor, so that push button switch 287 can then be opened. Current flows between lines 280 and 281 by means of closed contact 290 and coil 288. At the same time current flows in parallel through coil 291 to close contact 250 (Fig. 4). By a similar operation of closing switches to connect a control system for conveyor B to lines 240 and 241 along with turning the switch similar to switch 284 and closing a push button switch similar to switch 287, a coil similar to coil 288 is energized in the starter for the motor of conveyor B. This operation closes a contact similar to contact 290 so that the coil of the motor starter is still energized after the switch like the push button switch 287 is opened. In addition a coil like 291 of the control system for conveyor A is energized to close contact 251 (Fig. 4).

It is seen from Fig. 5 that, so long as switches 282 and 283 are closed and switch 284 is in the automatic position, the motor for conveyor A, after the start by momentarily closing switch 287, will continue to operate, because coil 288 of the starter for the motor will maintain contact 290 in the closed position. This maintains coil 291 of a relay in the energized state so as to maintain contact 250 in the closed position. Similarly continued operation of the motor for conveyor B maintains contact 251 in the closed position.

When carriage 17 is in the position indicated in Figs. 1 and 3, limit switch LS-B2 is engaged by cam 195 to close contact 261 and open contact 271. Because cam 193 does not engage limit switch LS-A2 when carriage 17 is in the position indicated in Figs. 1 and 3, contact 260 is open and contact 268 is closed as indicated in Fig. 4. Because neither arms 120 nor arms 150 of portions 14 and 15 of conveyor 13 are not being engaged by a composite assembly 135 at the start of the transfer car assembly 11, limit switches LS-A1 and LS-B1 are not engaged by cams 144 and 165, respectively. Thus contacts 264, 265, 267 and 270 are in the positions indicated in Fig. 4. When conveyors A and B are operating and switches 238 and 239 are closed, current will flow through coil 266 because of closed contacts 250, 251, 264, and 265. Energization of coil 266 of a motor starter operates motor 62 that operates conveyor 13 on carriage 17. Simultaneously, coil 262 in parallel with coil 266 will be energized.

As mentioned above, coil 262 is the coil of a time-delay relay that closes contact 263 (Fig. 6). Contact 300 is closed by energization of coil 266 of the starter for motor 62. So long as motor 62 is operating, i. e., coil 266 is being energized, contact 300 remains closed. With the closing of contacts 293 and 294 and the placing of switch 297 in the automatic position current flows through contacts 263 and 300 to energize coil 301 of the starter for the motor that operates conveyor C. When motor 62 is stopped as described below, contact 300 will open immediately along with the three contacts of the three-phase line that were initially closed to operate motor 62 by current flowing through coil 266. However, even though current stops flowing through coil 262 of a time-delay relay at the same time that current stops flowing through coil 266, the relay being of a time-delay type will prevent contact 263 from opening for a determined number of seconds.

In the preferred embodiment the time delay between the deenergization of coil 262 and the opening of switch 263 was six seconds. This is the time necessary in the preferred operation from the time limit switch LS-A1 or LS-B1 is actuated until carriage 17 is moved from one end of frame 18 to the other end so that cam 193 engaging limit switch LS-A2 or cam 195 engaging limit switch LS-B2, dependent upon which movement is involved, i. e., to the left or to the right, closes either contact 260 or 261 for current to flow again through coil 266 and, of course, through coil 262. If the appropriate contact, either contact 260 or contact 261, were not closed within the six-second period, it is seen that at the end of that period contact 300 will remain open because current is not passing through coil 266. Also contact 263 will open because of failure of resumption of current through coil 262. Thus both contacts 263 and 300 will be open and current will stop flowing through coil 301 of the motor starter for conveyor C and conveyor C will stop operating until the operation of motor 62 is resumed. This prevents transferring or conveying a composite assembly 135 from conveyor C to conveyor 13 until the latter is ready to receive the composite assembly 135. Of course, if desired, the motor for conveyor C can be operated without the foregoing control by turning switch 297 to manual position, but this eliminates the safety feature described above.

With conveyors A, B and C, as well as conveyor 13 placed in operation as described above a composite assembly 135 when conveyed along conveyor C will be transferred to portion 14 of conveyor 13. Assembly 135 will be moved by doughnut wheels 140 across conveyor portion 14 to engage actuating arms 120 to rotate shaft 112. By rotation of shaft 112 cam 144 engages limit switch LS-A1 thereby opening contact 264 and closing contact 267. Contacts 260 and 261 of limit switches LS-A2 and LS-B2 are in the normally open position and the closed position, respectively. Opening of contact 264 will stop flow of current through both of coil 262 of a time-delay relay and coil 266. The six-second period of the relay will be started, after which contact 263 will open and conveyor C will stop if coil 262 is not re-energized. Deenergizing coil 266 stops motor 62 of conveyor 13 and assembly remains on conveyor portion 14 in engagement with arms 120. Closing of contact 267 by actuation of limit switch LS-A1 as described above closes circuit 258, because contact 268 is normally closed. Current will flow through solenoid or coil 223 thereby moving the piston of valve 208 to introduce compressed air into chamber 221 of air cylinder 30 and exhaust air from chamber 220 through valve 208 to valve 200 and out free exhaust line 211. This energization of solenoid 223 results in piston rod 64 retracting into air cylinder 30 thereby moving carriage 17 from right to left. The flow of compressed air through valve 208 into chamber 221 and the flow of air out of chamber 220 through valve 208 and valve 200 has been previously described. Also as mentioned above, when carriage 17 has almost reached the left-hand maximum point of movement, cam 199 engages valve 200 so that air being exhausted from chamber 220 through valve 200 is exhausted through controlled exhaust line 212 rather than free exhaust line 211. This throttles the movement of piston rod 64 into air cylinder 30 before the maximum position of retraction of rod 64 into cylinder 30 is reached. A retraction continues at a reduced rate until the final position to the left is reached.

When carriage 17 has moved to the left, as viewed in Fig. 1, to its maximum limit of travel, conveyor portion 14 is in alignment with conveyor A and conveyor portion 15 is in alignment with conveyor C. When carriage 17 has reached the maximum left-hand position of its movement, cam 193 actuates limit switch LS–A2 to close contact 260 and open contact 268. Contact 264 was opened when assembly 135 engaged arms 120. Current now flows through closed contacts 250, 251, and 260, line 276 and contact 265 to energize coil 266 to start motor 62. Resumption of rotation of doughnut rolls 140 transfers composite assembly 135 from conveyor 13 to conveyor A. At the same time that rotation of rolls 140 is resumed, of course, rotation of doughnut rolls 149 is resumed and then conveyor portion 15 can receive the second composite assembly 135 from conveyor C. It was pointed out above that actuation of limit switch LS–A2 opens contact 268 thereby deenergizing solenoid 223. Transfer of the first composite assembly 135 from engagement with arms 120 to conveyor A permits counterweight 130 to reverse rotation of shaft 112 until stop member 143 engages channel member 44. The rotation disengages contact of cam 144 with limit switch LS–A1 thereby reclosing contact 264 and reopening contact 267.

The composite assembly 135 being transferred across portion 15 of conveyor 13 by means of rotating doughnut rubber wheels 149 will contact actuating arms 150 to rotate shaft 114 until cam 165 engages limit switch LS–B1. Contact 265 is opened and contact 270 is closed by actuation of limit switch LS–B1. Opening of contact 265 stops motor 62 as well as deenergizes coil 262 to start the six-second period of the time-delay relay to open contact 263 if coil 262 is not reenergized within the six seconds.

Closing of contact 270 will allow current to flow through closed contacts 250, 251, 271 and 270 to energize solenoid 224. Energization of coil 224 moves the piston of valve 208 in the direction reverse to the movement provided by the actuation of solenoid 223. This results in compressed air flowing through valve 208 into chamber 220 of air cylinder 30, as described above, and air being exhausted from chamber 221 through valve 208 and through valve 198 and out free exhaust line 204. Introduction of compressed air into chamber 220 and removal of air from chamber 221 moves piston rod 64 outwardly from the air cylinder 30 thereby moving carriage 17 from left to right as viewed in Fig. 1.

Just before carriage 17 reaches the maximum right-hand position of its movement, valve 198 is actuated by cam 197 so that air is exhausted out of controlled exhaust line 205 instead of free exhaust line 204. This retards the rate of movement of piston rod and thereby gradually slows down carriage 17 until carriage 17 reaches the maximum position of movement to the right. At this point cam 195 engages limit switch LS–B2 to close contact 261 and open contact 271. Opening contact 271 deenergizes solenoid 224. Contact 264 of limit switch LS–A1 was closed when the first composite assembly moved away from arms 120. Current flows through closed contacts 250, 251 and 264, line 276, closed contact 261 and line 277 to energize coil 266 to start motor 62. At the same time, coil 262 is reenergized so that contact 263 in the control system for conveyor C is again closed along with contact 300 by energization of coil 266. Thus conveyor 13 resumes its operation and conveyor C continues its operation. Rotation of doughnut rolls 149 of conveyor portion 15 by motor 62 unloads the second composite assembly 135 onto conveyor B and rotating doughnut wheels 140 of conveyor portion 14 can receive another composite assembly 135 to repeat the cycle described above.

In the foregoing description, it is seen how composite assemblies 135 are transferred from conveyor C alternately to conveyors A and B by means of transfer car assembly 11. In the event it is desired to transfer composite assemblies 135 from conveyor C only to conveyor A, e. g., when conveyor B is shut down for repairs, the motor for conveyor B will not be operating. With the coil of the starter for the motor of conveyor B deenergized, contact 251 will be in the open position. To by-pass open contact 251, switch 253 is closed. Switch 252 is left open so that motor 62 of conveyor 13 and the motor of conveyor C will stop if the motor of conveyor A stops. Furthermore, because composite assemblies 135 will only be loaded onto conveyor portion 14 for transfer to conveyor A, actuating arms 150 will not be engaged and limit switch LS–B1 will not be actuated to close contact 270. In order to actuate solenoid 224, it is necessary to by-pass open contact 270. This repetitive loading on conveyor A is accomplished by utilizing contact 275 by closing switch 274. Contact 275 is closed by the actuation of limit switch LS–A3 when a composite assembly 135 moves actuating arms 166 on conveyor A. Thus carriage 17 can be moved to the right as soon as composite assembly 135 has been conveyed off of conveyor portion 14 onto conveyor A because of the closing of contact 275 by the actuation of limit switch LS–A3 which allows current to flow through closed contact 250, closed switch 253, closed contact 271, closed switch 274 and closed contact 275 to energize coil 224 to move piston 64 as described above in the alternating procedure. The balance of the operation is same as the alternating cycle described above except motor 62 is stopped only when contact 264 is opened because contact 265 is never opened. Motor 62 is restarted to unload when contact 260 is closed by cam 193 engaging limit switch LS–A2. Motor 62 remains operating even when cam 93 disengages limit switch LS–A2 in the movement of carriage 17 to the right because unloading of assembly 135 to conveyor A results in closing contact 264.

In a like manner the use of the control system for conveyor 13 can be utilized for the reciprocation of carriage 17 on frame 18 and the loading and unloading of conveyor portion 15 when the motor for conveyor A is not operating and all composite assemblies 135 are to be transferred from conveyor C to conveyor B. Contact 250 will be open because the motor for conveyor A is not operating and it is by-passed by closing switch 252. Switch 253 is left open so that if the motor of conveyor B stops, motor 62 of conveyor 13 and the motor of conveyor C will stop. Limit switch LS–A1 will not be actuated by a composite assembly 135 engaging actuating arms 120 and thus contact 264 in circuit 257 remains closed and contact 267 in circuit 258 remains open. Contact 267 is by-passed by the use of contact 273 and by closing switch 272. The unloading of composite glass assembly 135 from conveyor portion 15 onto conveyor B actuates arms 167 to actuate limit switch LS–B3 thereby closing contact 273. Current then flows through closed switch 252, line 278, closed contact 251, closed switch 272, closed contact 273 and closed contact 268 to actuate solenoid 223 to move carriage 17 from right to left as viewed in Fig. 1. In other respects the operation is similar to the repetitive transfer to conveyor A, except assembly 135 being loaded on conveyor portion 15 opens contact 265 to stop the motor. Contact 264 remains closed at all times. Motor 62 is restarted to unload at the right position by cam 195 engaging switch LS–B2 to close switch 261. Then current flows through closed contact 264, line 276, closed contact 261 and line 277 to energize coil 266. Movement of assembly 135 from arms 150 closes contact 265 and motor continues to run even when carriage moves to the left thereby opening contact 261.

The foregoing embodiments of the present invention and the operation of the transfer car assembly in accordance with these preferred embodiments have been presented for purposes of illustration only and not to limit the invention which is limited only by the claims which follow.

We claim:

1. An assembly for transferring articles which comprises a supporting structure, a carriage movably mounted on the supporting structure, means for reciprocating the carriage on the supporting structure between a first position and a second position, a conveyor mounted on the carriage and having a first conveyor portion and a second conveyor portion, said second portion occupying with the carriage in the second position at least a part of the area occupied by the first portion with the carriage in the first position, means for operating said conveyor, means actuated by an article on the first portion for stopping said operating means, means actuated by said article on the first portion with the carriage in the first position for actuating said reciprocating means to move said carriage from the first position to the second position, means actuated by the carriage in the second position to start the operating means, and means actuated by an article moving relative to the conveyor for actuating the reciprocating means to move the carriage from the second position to the first position.

2. An assembly for transferring articles which comprises a supporting structure, a carriage movably mounted on the supporting structure, means for reciprocating the carriage on the supporting structure between a first position and a second position, a conveyor mounted on the carriage and having a first conveyor portion and a second conveyor portion, said second portion occupying with the carriage in the second position the area occupied by the first portion with the carriage in the first position, means for operating said conveyor, means actuated by an article on the first portion for stopping said operating means, means actuated by said article on the first portion with the carriage in the first position for actuating said reciprocating means to move said carriage from the first position to the second position, means actuated by the carriage in the second position to start the operating means, and means actuated by an article moving relative to the conveyor for actuating the reciprocating means to move the carriage from the second position to the first position.

3. An assembly for transferring articles which comprises a supporting structure, a carriage movably mounted on the supporting structure, means for reciprocating the carriage on the supporting structure between a first position and a second position, a conveyor mounted on the carriage and having a first conveyor portion and a second conveyor portion, said conveyor being mounted to convey articles transverse to said reciprocation and said second portion occupying with the carriage in the second position at least a part of the area occupied by the first portion with the carriage in the first position, means for operating said conveyor, means actuated by an article on the first portion for stopping said operating means, means actuated by said article on the first portion with the carriage in the first position for actuating said reciprocating means to move said carriage from the first position to the second position, means actuated by the carriage in the second position to start the operating means, and means actuated by an article moving relative to the conveyor for actuating the reciprocating means to move the carriage from the second position to the first position.

4. An assembly for transferring articles which comprises a supporting structure, a carriage movably mounted on the supporting structure, means for reciprocating the carriage on the supporting structure between a first position and a second position, a conveyor mounted on the carriage and having a first conveyor portion and a second conveyor portion, said conveyor being mounted to convey articles transverse to said reciprocation and said second portion occupying with the carriage in the second position the area occupied by the first portion with the carriage in the first position, means for operating said conveyor, means actuated by an article on the first portion for stopping said operating means, means actuated by said article on the first portion with the carriage in the first position for actuating said reciprocating means to move said carriage from the first position to the second position, means actuated by the carriage in the second position to start the operating means, and means actuated by an article moving relative to the conveyor for actuating the reciprocating means to move the carriage from the second position to the first position.

5. An assembly for transferring articles which comprises a supporting structure, a carriage movably mounted on the supporting structure, means for reciprocating the carriage on the supporting structure between a first position and a second position, a conveyor mounted on the carriage and having a first conveyor portion and a second conveyor portion, said conveyor being mounted to convey articles transverse to said reciprocation and said second portion occupying with the carriage in the second position the area occupied by the first portion with the carriage in the first position, means for operating said conveyor, means actuated by an article on the first portion for stopping said operating means, means actuated by said article on the first portion with the carriage in the first position for actuating said reciprocating means to move said carriage from the first position to the second position, means actuated by the carriage in the second position to start the operating means, means actuated by an article on the second portion for stopping said operating means, and means actuated by said article on the second portion with the carriage in the second position for actuating said reciprocating means to move said carriage from the second position to the first position.

6. An assembly for transferring articles which comprises a supporting structure, a carriage movably mounted on the supporting structure, means for reciprocating the carriage on the supporting structure between a first position and a second position, a conveyor mounted on the carriage and having a first conveyor portion and a second conveyor portion, said conveyor being mounted to convey articles transverse to said reciprocation and said second portion occupying with the carriage in the second position the area occupied by the first portion with the carriage in the first position, means including a motor and a coil for a starter of the motor for operating the conveyor, a first circuit for energizing said coil and including a first normally open contact and a first normally closed contact, a second circuit for energizing said coil and including a second normally open contact and a second normally closed contact, means actuated by the carriage in the second position for closing the first normally open contact, means actuated by the carriage in the first position for closing the second normally open contact, means actuated by an article on the first portion to open the first normally closed contact, and means actuated by an article moving relative to the conveyor for opening the second normally closed contact, means actuated by the article on the first portion with carriage in the first position for actuating said reciprocating means to move the carriage from the first position to the second position, and means actuated by the article moving relative to the conveyor for actuating the reciprocating means to move the carriage from the second position to the first position.

7. The assembly of claim 6 wherein the reciprocating means includes a third circuit including a first solenoid, a third normally open contact and a third normally closed contact, a fourth circuit including a second solenoid, a fourth normally open contact and a fourth normally closed contact, means actuated by said article on the first portion for closing the third normally open contact to energize said first solenoid, means actuated by the carriage in the second position to open the third normally closed contact to deenergize said first solenoid, means actuated by the article moving relative to the conveyor to close the fourth normally open contact for energizing the second solenoid, and means actuated by the carriage in the first position to open the fourth normally closed contact for deenergizing the second solenoid.

8. The assembly of claim 7 wherein the means actuated by the article moving relative to the conveyor to open the second normally closed contact and the means actuated by the article moving relative to the conveyor for closing the fourth normally open contact are mounted to be actuated by the article on the second portion of the conveyor.

9. The assembly of claim 7 and further including a feeding conveyor assembly for transferring the articles to the conveyor on the carriage in the first position, said conveyor assembly including a feeding conveyor and means for operating the feeding conveyor and comprising a second coil for a starter for a motor for operating the feeding conveyor, a fifth circuit having a fifth normally open contact and a sixth circuit having a sixth normally open contact, said fifth and sixth circuits being in parallel with one another and both circuits being in series with said second coil of the feeding conveyor, and a third coil for a time-delay relay and in parallel with the first-mentioned coil, said third coil actuating the fifth normally open contact and said first coil actuating the sixth normally open contact.

10. The assembly of claim 9 and further including a first receiving conveyor assembly having a first receiving conveyor and means for operating the first receiving conveyor including a fourth coil for a starter for a motor for said first receiving conveyor, said first receiving conveyor being positioned to receive articles from the first portion with the carriage in the second position, a second receiving conveyor assembly having a second receiving conveyor and means for operating said second receiving conveyor including a fifth coil for a starter for a motor for said second receiving conveyor, said second receiving conveyor being positioned to receive articles from the second portion with the carriage in the first position, a seventh normally open contact, and an eighth normally open contact, said seventh and eighth normally open contacts being in series with one another and in series with the first circuit and the second circuit, the coil of the first receiving conveyor assembly actuating the seventh normally open contact and the coil of the second receiving conveyor actuating the eighth normally open contact.

References Cited in the file of this patent

UNITED STATES PATENTS 1,871,832     Absmeier _____ Aug. 16, 1932